C. H. HACKETT & T. W. MORGAN.
CENTRIFUGAL CREAM SEPARATOR.
APPLICATION FILED DEC. 21, 1907.

INVENTORS
C. H. Hackett & T. W. Morgan,

C. H. HACKETT & T. W. MORGAN.
CENTRIFUGAL CREAM SEPARATOR.
APPLICATION FILED DEC. 21, 1907.

907,143.

Patented Dec. 22, 1908.

2 SHEETS—SHEET 2.

WITNESSES:
H. B. Burr.
Ila Haydank.

INVENTORS.
C. H. Hackett & T. W. Morgan.
BY G. C. Kennedy
ATTORNEY.

UNITED STATES PATENT OFFICE.

CHARLES H. HACKETT AND THOMAS W. MORGAN, OF WATERLOO, IOWA, ASSIGNORS TO WILBUR W. MARSH, OF WATERLOO, IOWA.

CENTRIFUGAL CREAM-SEPARATOR.

No. 907,143.  Specification of Letters Patent.  Patented Dec. 22, 1908.

Application filed December 21, 1907. Serial No. 407,465.

*To all whom it may concern:*

Be it known that we, CHARLES H. HACKETT and THOMAS W. MORGAN, citizens of the United States of America, and residents of Waterloo, Blackhawk county, Iowa, have invented certain new and useful Improvements in Centrifugal Cream-Separators, of which the following is a specification.

Our invention relates to improvements in centrifugal cream separators, and the object of our improvement is to provide a liner for a separator bowl, composed of a vertical series of separated superimposed frusta, the said series being arranged in a plurality of sets of frusta, each set truncated to a different depth from the others, grouped in the bowl so as to have the more deeply truncated frusta nearest the milk inlet and the others arranged in successive groups above, the effect being to diminish the axial openings of the series by steps in a direction running from the milk inlet to the milk outlet at the opposite end of the bowl, and thus give more clearance space for the cream at that part of the bowl where it begins to separate from the full milk than at the other parts of the axial hollow where less clearance space is necessary for that purpose but a greater amount of baffling surface in the frusta is useful. This object we have accomplished by the means which are hereinafter described and claimed, and which are illustrated in the accompanying drawing, in which—

Figure 1:
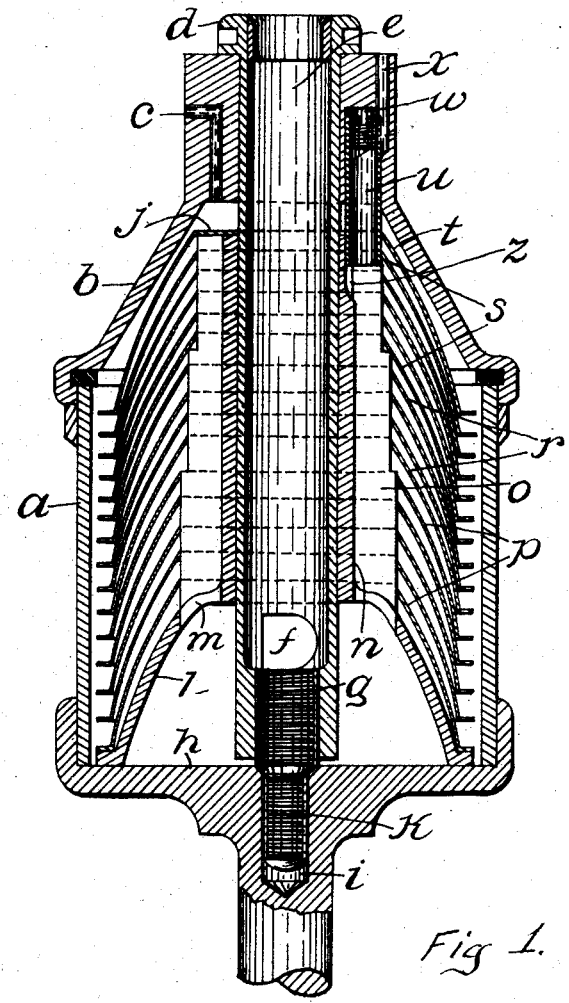
Figure 2:
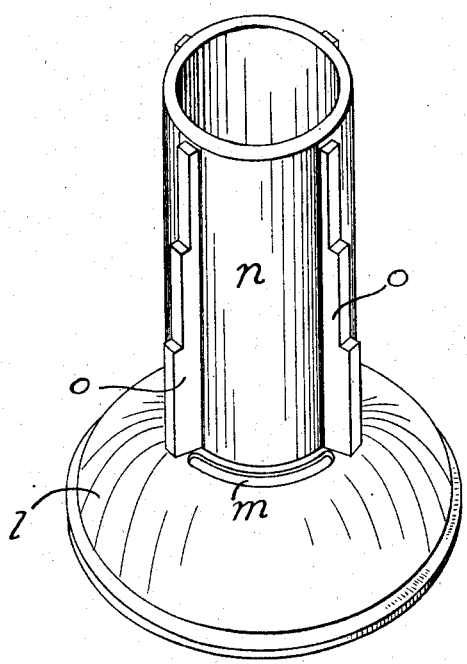

Figure 1 is a vertical central axial section of a centrifugal cream separator bowl containing our improved liner. Fig. 2 is a perspective of the cylinder $n$ and its frustal base $l$.

The separator bowl $a$ is furnished with a conical cover $b$ having a cylindrical upward extension whose axial hollow is designed to contain the clamping-bolt $d$. The latter has a fillet at its upper end to engage with the top of said cover, while the inner portion of the lower end of its axial cavity $e$ is interiorly threaded to engage the outer threads on a removable plug $g$, the lower end $k$ of the latter being threaded to engage threads in an axial orifice $i$ in the bottom $h$ of the bowl $a$. By this means the cover may be securely clamped down upon said bowl. The central hollow $e$ of said bolt or inlet-tube $d$ communicates with the interior of the bowl $a$ by means of an opening $f$ in the wall of the tube.

A hollow cylinder $n$ is adapted to detachably embrace the axial inlet-tube $d$ for a portion of the latter's length within the bowl, but the lower portion of said cylinder is expanded to form a hollow frustum $l$ whose top is covered except for the axial opening and a plurality of orifices $m$, the latter forming a means of communication between the cavity under said frustum $l$ and the cream zone of the bowl situated about the exterior of the said cylinder $n$.

The frustum $l$ surrounds the lower portion of the tube $d$, so that the full milk may be discharged from the inlet $f$ thereunder to pass upward into the bowl through the openings $m$, the latter extending far enough radially as to afford opportunity for such full milk to move upward into the bowl without the cream zone and without interference with the latter.

The cavity of the bowl $a$ above the frustum $l$ is filled with a vertical series of superimposed frusta spaced apart, such series however being divided into several groups of frusta, each of said groups being truncated differently from the others. The frusta being of the same general dimensions, and concentric, the lowermost group composed of a plurality of frusta $p$, is most deeply truncated. The groups composed of the less deeply truncated frusta $r$ and $s$ are located respectively above the group $p$ and each other as shown. It is not intended to confine ourselves, however, to any particular number of such varying groups of frusta, any desired number may be used in which each group consists of two or more units, without derogating from the scope of our invention.

In order to keep the various groups above described in proper concentric arrangement in the bowl, we have supplied radial buttresses $o$ integral with and projecting outward from the cylinder $n$. Each of the buttresses consists of the stepped portions shown, of which the lowermost is the widest, the others decreasing in width to correspond with the lessening truncations of the groups of frusta $r$ and $s$. The said buttresses thus serve as graduated spacers for the respective groups of frusta, and serve to keep them all in proper alinement.

The uppermost frustum $t$ has its top closed in by an annular plate $j$ adapted to fit removably about the tube $d$, the top of the cylinder $n$ just contacting with its lower surface.

The plate $j$ is perforated to receive a tube $u$ which is fixed therein so as to have its lower end project a short distance below it and into a groove $z$ in the outer wall of the cylinder $n$, so as to drain off the cream in the cream zone below. The tube $u$ is adapted to be removably inserted in a bored out hole $w$ in the cover $b$, and another passage in said cover at $x$ serves to effect a communication between the interior of the tube $u$ and the exterior of the bowl. A milk-exit $c$ is provided in the cover $b$ at the opposite end of the bowl from the milk-inlet opening $f$.

In operation the milk which is ejected through the port $f$ below the frustum $l$, moves upward through the openings $m$ and just outside of the cream zone through the liner, and is sprayed outward into the interspaces of the superposed frusta in the usual manner. The arrangement of the frusta into groups as shown, thus affords greater amount of clearance space for the separating cream in the early part of the milk's course at which time the full milk readily separates from its copious proportion of cream, and more space is required for its reception. In its continued passage upward, the current of depleted milk needs less space for its reception, so the spaces between the truncated edges of the frusta are lessened at predetermined distances, and the overarching edges of the latter frusta thus afford additional baffling and collecting surfaces to catch and deliver the smaller globules of cream where the depleted milk requires less space for its passage between the parts of the liner.

Having described our invention, what we claim as new and desire to secure by Letters Patent, is:—

1. In a centrifugal cream separator, the combination with a bowl having a cream exit, a milk inlet in one end and a milk exit in the other end, of a series of superposed separated hollow frusta contained therein, arranged in groups, the groups being differently truncated to have axial openings of differing diameters, the most deeply truncated group being located nearest the milk inlet, and the other groups arranged successively above it, so as to provide an axial channel through said liner abruptly diminishing in diameter in steps in a direction from the said milk inlet to the milk exit.

2. In a centrifugal cream separator, the combination with a bowl having a cream exit, a milk inlet in one end and a milk exit in the other end, of a series of superposed separated hollow frusta contained in said bowl, the frusta being arranged in groups of several frusta each, the groups being differently truncated to have the axial openings of each group of a different diameter than the axial openings of any other group, the most deeply truncated group being located nearest the milk inlet, and the other groups arranged successively above it, so as to provide an axial channel through said liner abruptly diminishing in diameter with each change of group in a direction leading from said milk inlet to the milk exit, and means for spacing said respective groups of frusta and holding them in the same concentric alinement in said bowl.

3. In a centrifugal cream separator, the combination with a bowl having a cream exit, and a milk exit at one end, of a milk-inlet tube having its delivery end at the opposite end of the bowl from the milk exit, a cylinder removably seated about said inlet-tube, said cylinder having an expanded lower end resting upon the bottom of the bowl and spaced away from the lower end of the inlet-tube, said expanded portion also provided with a plurality of channels adjacent to the inlet-tube to afford communication between the milk-inlet and the inner zone of the bowl above said expansion, and a series of superimposed separated hollow frusta in said bowl seated above said expanded portion of the cylinder, the frusta being arranged in groups of several frusta each, all the frusta in each group being truncated alike, but the frusta of the different groups being differently truncated so as to have the axial openings of each group of a different diameter than the axial openings of any other group, the most deeply truncated group being located nearest the milk inlet delivery opening, and the other groups arranged successively above it, so as to provide an axial channel through said liner abruptly diminishing in diameter with each change of group in a direction leading from said milk inlet delivery opening to said milk-exit, and stepped radial wings projecting from the said cylinder adapted to secure said respective groups of frusta in the same concentric alinement in said bowl.

Signed at Waterloo, Iowa, this 2d day of Dec., 1907.

CHARLES H. HACKETT.
THOMAS W. MORGAN.

Witnesses:
  O. D. YOUNG,
  G. C. KENNEDY.